United States Patent
Best et al.

(10) Patent No.: US 7,481,457 B2
(45) Date of Patent: Jan. 27, 2009

(54) STRUCTURAL KNEE BOLSTER

(75) Inventors: Michael James Best, Newmarket (CA);
Dale Carson, Lake Orion, MI (US);
Timothy W. Chapman, Etobicoke (CA);
Rimas Ciplijauskas, Etobicoke (CA);
Babak Fana, Mississauga (CA); Gary Gerlach, Rochester, MI (US); Raj S. Roychoudhury, Bloomfield Hills, MI (US); Changize Sadr, North York (CA);
Ali Totonchian, Toronto (CA)

(73) Assignee: Salflex Polymers Ltd., Weston, Ontario (CA)

( * ) Notice: Subject to any disclaimer, the term of this patent is extended or adjusted under 35 U.S.C. 154(b) by 0 days.

(21) Appl. No.: 12/043,731

(22) Filed: Mar. 6, 2008

(65) Prior Publication Data

US 2008/0150268 A1    Jun. 26, 2008

Related U.S. Application Data

(63) Continuation of application No. 10/930,535, filed on Aug. 31, 2004, now Pat. No. 7,393,013.

(60) Provisional application No. 60/500,446, filed on Sep. 5, 2003.

(51) Int. Cl.
*B60R 21/045* (2006.01)
(52) U.S. Cl. .................. 280/752; 280/750; 280/751; 296/70
(58) Field of Classification Search .............. 280/750, 280/751, 752; 296/70, 72
See application file for complete search history.

(56) References Cited

U.S. PATENT DOCUMENTS 3,788,223 A * 1/1974 Schaefer ............... 102/332

(Continued)

FOREIGN PATENT DOCUMENTS

EP    0 678 425 A1    10/1995

(Continued)

*Primary Examiner*—Toan C To
(74) *Attorney, Agent, or Firm*—Michael Best & Friedrich LLP

(57) ABSTRACT

A bolster for assembly to an instrument panel assembly of an automotive vehicle is provided. The vehicle has a steering column with a steering column axis and at least two energy absorbing brackets located laterally to either side of the steering column axis. The bolster comprises a unitary structure having a generally forward wall and a generally aft wall. The forward wall has a forward wall, forward surface. The forward wall, forward surface includes first and second bolster transfer surfaces for transferring forces from the bolster to the energy absorbing brackets. The bolster further comprises a plurality of generally laterally extending rib structures. The rib structures extend from adjacent the first bolster transfer surface to adjacent the second bolster transfer surface. The plurality of generally laterally extending ribs structures have sufficient strength to inhibit bending of the bolster about a vertical plane when struck by a driver's knees at a point or points that are not directly aft of the bolster transfer surfaces, when the force is equal to or less than an amount specified by a test standard.

11 Claims, 4 Drawing Sheets

U.S. PATENT DOCUMENTS

| | | | |
|---|---|---|---|
| 4,662,649 A * | 5/1987 | Ikeda et al. | 280/752 |
| 5,096,223 A * | 3/1992 | Tekelly et al. | 280/748 |
| 5,201,544 A * | 4/1993 | Matano et al. | 280/751 |
| 5,326,130 A | 7/1994 | Gedeon et al. | |
| 5,370,417 A * | 12/1994 | Kelman et al. | 280/751 |
| 5,816,613 A * | 10/1998 | Specht et al. | 280/753 |
| 5,865,468 A | 2/1999 | Hur | |
| 5,927,755 A | 7/1999 | Matsuo et al. | |
| 6,142,522 A * | 11/2000 | Bossenmaier et al. | 280/752 |
| 6,213,497 B1 | 4/2001 | Spencer et al. | |
| 6,578,867 B2 * | 6/2003 | Khoudari et al. | 280/730.1 |
| 6,619,689 B2 * | 9/2003 | Spencer et al. | 280/730.1 |
| 6,758,493 B2 * | 7/2004 | Conlee et al. | 280/753 |
| 6,783,156 B2 * | 8/2004 | Chickmenahalli et al. | 280/752 |
| 6,948,738 B2 * | 9/2005 | Garnweidner et al. | 280/752 |
| 6,991,252 B2 * | 1/2006 | Enders | 280/728.1 |
| 2001/0054811 A1 | 12/2001 | Spencer et al. | |

FOREIGN PATENT DOCUMENTS

EP     0 678 425 B1     9/1997

* cited by examiner

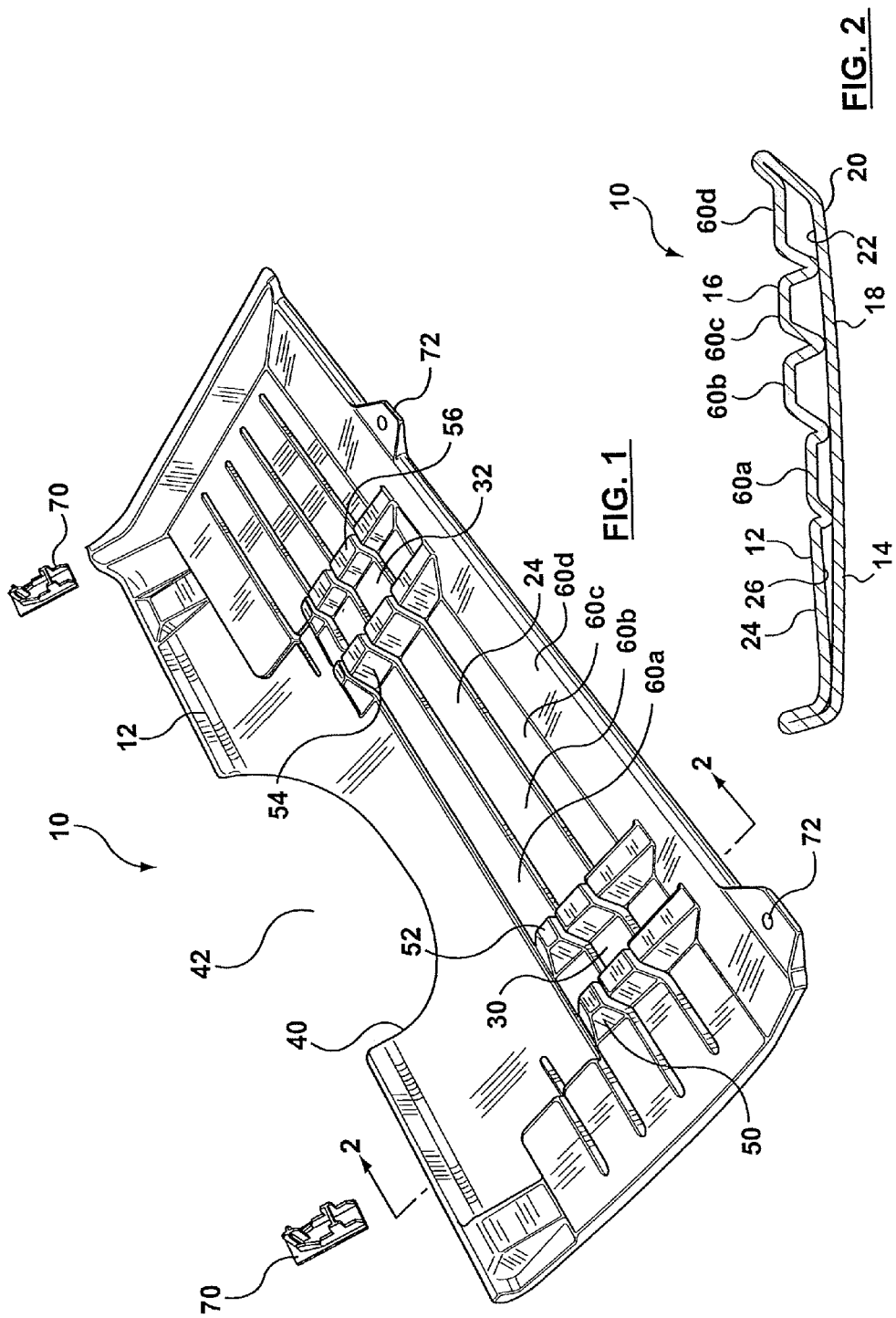

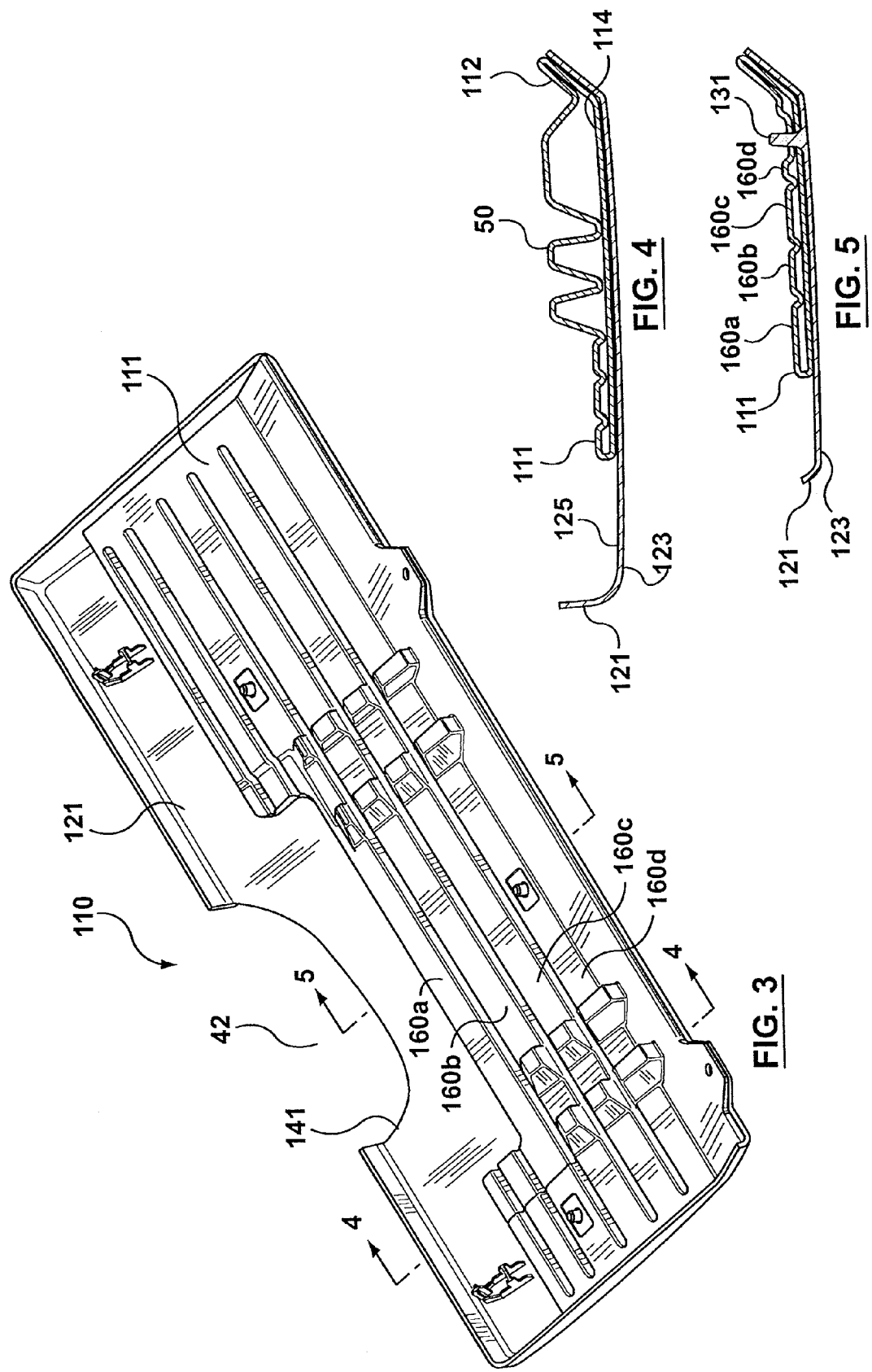

STRUCTURAL KNEE BOLSTER

CROSS-REFERENCE TO RELATED APPLICATIONS

This application is a continuation of co-pending U.S. patent application Ser. No. 10/930,535, filed Aug. 31, 2004, which claims benefit from U.S. provisional application Ser. No. 60/500,446 filed Sep. 5, 2003, all of which are incorporated herein by reference in their entirety.

FIELD OF THE INVENTION

The invention relates to bolsters for an instrument panel for an automotive vehicle and more particularly to a bolster which is located adjacent the steering column of the vehicle.

BACKGROUND OF THE INVENTION

In the manufacture of automotive vehicles such as passenger cars and trucks, there are many safety standards that must be met by the vehicle to reduce the likelihood and/or severity of injury to occupants during an accident.

For example, in the United States, the safety standard FMVSS/208 deals with occupant crash protection during a frontal crash. In order to meet the safety standard, portions of an instrument panel assembly are required to absorb at least some of the energy of an impact by the knees of the driver during a crash. A portion of the instrument panel that is configured to sustain an impact from the knees of a driver during a crash is called a bolster. This is the portion of the instrument panel below the belt line.

Government tests are conducted on vehicles to determine if they meet the safety standard, based on the statistically median-sized male occupant. The median-size is a statistically determined size whereby 50% of the population is larger and 50% of the population is smaller.

Vehicle safety standards also require special design parameters relating to the steering column of the vehicle. The steering column must be designed to move in an axial direction if the chest of the driver contacts the steering wheel in the course of a crash. Most steering columns are designed to collapse in an axial direction and the steering column is located and designed with the collapsing structure being calculated on the basis that the steering column is not impacted by other structures within the vehicle. A further aspect of the impact safety design of the vehicle is that the driver's knees will contact the bolster area with one knee on either lateral side of the axis of the steering column. As the driver's knees contact the bolster area, the bolster may bend about a generally vertical plane. Bending of the bolster about a vertical plane may then result in some of the instrument panel structure, including the bolster itself, infringing on the space envelope allowed for the steering column structure. If there is any contact of this surrounding structure with the steering column, then the collapse characteristics of the steering column, in accordance with its design, will be changed due to contact from surrounding structure.

In order to deal with this problem, it is routine in automotive design to include a relatively strong structure, typically a metallic plate, which is attached to the instrument panel structure and which surrounds the steering column envelope. The metal plate may be attached to the bolster or to underlying instrument panel structure. The metal plate is more properly called a steering column protector and is sometimes referred to colloquially as a knee splitter. The function of the structure is to keep the driver's knees spread apart so that neither the knees, the bolster nor any other surrounding structure infringes on the steering column envelope. This ensures that the steering column can collapse in accordance with its designed function.

Most vehicles today have structure built in to help absorb the energy generated by the impact of the driver's knees on the bolster. Typically most vehicles have energy absorption brackets mounted laterally to either side of the steering column axis outside the steering column envelope. Energy is dissipated as the driver's knees contact the bolster pushing the bolster against the energy absorption brackets and some energy is dissipated by the energy absorption bracket. The energy absorption brackets are located to provide protection to the median sized person as constrained by the vehicle geometry.

In the existing design envelope, bolsters applied to the steering wheel area of cars are relatively complicated structures comprising a bolster as well as the steering column protector. The bolster generally is a surface of the instrument panel that would otherwise be available for viewing by a vehicle occupant and thus the bolster area must meet certain appearance characteristics. Heretofore, bolsters have been made from injection-molded parts, which have good appearance characteristics on the surface which is visible within the vehicle. However, due to the very nature of injection molding, parts made by the injection molding process often have less strength that might otherwise be available from the plastic resins used in the injection molding process. In such designs, an injection-molded bolster is created which has suitable appearance characteristics and the bolster is strengthened by a metallic plate. The steering column protector serves the function of protecting the steering column with the assumption that the driver's knees will be located substantially directly aft of the energy absorption brackets.

While this is a complicated and expensive structure to manufacture, there is also the question of what happens if the driver's knees are not located directly aft of the energy absorption structure. This may be as a result of the driver not meeting the 50 percentile adult male physical-size and the drivers seating position may locate the knees at some point other than directly aft of the energy absorption brackets.

SUMMARY OF THE INVENTION

In accordance with a first aspect of this invention, a bolster for assembly to an instrument panel assembly of an automobile vehicle includes a blow-molded component, the blow molded component having a generally aft wall and a generally forward wall. The bolster has first and second bolster transfer surfaces and a plurality of generally horizontally extending rib structures, the rib structures extending from adjacent the first bolster transfer surface to adjacent the second bolster transfer surface so that forces applied to the aft wall of the bolster in a location other than directly aft of said first and second bolster transfer surfaces, may be transferred through said bolster to said bolster transfer surfaces. The bolster has sufficient strength to prevent a substantial deformation of the bolster about a generally vertical plane when the bolster is subjected to a standardized force.

In accordance with another aspect of the invention, there is provided a bolster for assembly to an instrument panel assembly of an automotive vehicle, the bolster including an aft component, the aft component having an aft component, aft surface and an aft component, forward surface. The bolster also has a forward component, the forward component having a generally aft wall, the aft wall having a forward component, aft surface and an internal surface, the forward component having a generally forward wall, the generally forward wall having a forward component, forward surface and a forward internal surface.

In accordance with a preferred embodiment of the invention, the forward component is blow molded.

In accordance with a particularly preferred embodiment of the invention the aft component is injection molded.

In accordance with another aspect of the invention, the bolster includes bolster transfer surfaces for transferring forces applied to the aft surface of the aft component to vehicle structure adjacent the bolster transfer surfaces.

In accordance with another aspect of the invention, the bolster comprises rib structures for transferring forces applied to the aft surface of the aft component at other than directly aft of the bolster transfer surfaces, to the bolster transfer surfaces.

Various other features and objects of the invention may be completely understood from reference to the following description of a preferred embodiment of the invention.

BRIEF DESCRIPTION OF THE DRAWINGS

A more complete understanding of the invention may be had by reference to the following drawings, in which:

FIG. 1 is a perspective view of a first embodiment of the invention;

FIG. 2 is a cross section along the line 2-2 of the embodiment illustrated in FIG. 1;

FIG. 3 is a perspective view of an alternate embodiment of the invention;

FIG. 4 is a cross section of the embodiment of FIG. 3 along the line 4-4;

FIG. 5 is a cross sectional view of the embodiment shown in FIG. 3 along the line 5-5;

DETAILED DESCRIPTION OF THE INVENTION

Figure 6:
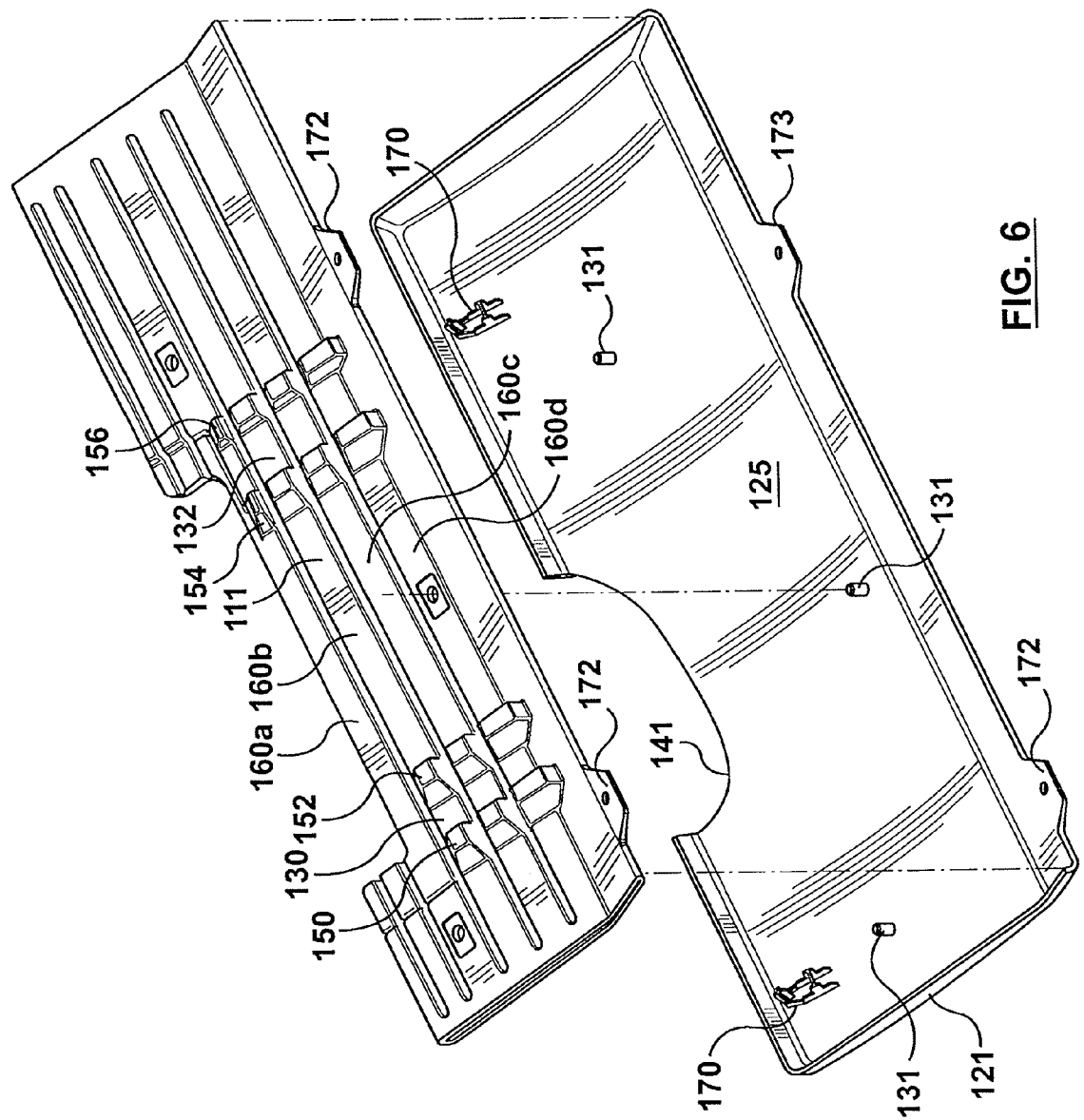
FIG. 6 is an exploded view of the embodiment illustrated in FIG. 3.

FIG. 1 illustrates a one-piece bolster 10. The bolster 10 has a forward facing surface 12 and an aft facing surface 14. The directions fore and aft or rearward and forward are used throughout this disclosure to refer to directions within the vehicle. The aft facing surface of the bolster is visible within the drivers compartment of the vehicle with the forward surface facing toward the front bumper, a surface which is not generally visible from within the vehicle. It will be understood that a bolster is typically a curved structure rather than planar, thus throughout this disclosure the surfaces and walls are referred to as generally aft and generally forward.

By reference to FIG. 2, it will be noted that the bolster 10 is a hollow structure having a forward wall 16 and an aft wall 18. The aft wall 18 has an aft surface 20 and an internal rear wall surface 22. The forward wall 16 has a forward surface 24 and an internal forward wall surface 26.

The bolster 10 includes a first bolster transfer surface 30 and a second bolster transfer surface 32. The bolster transfer surfaces 30 and 32 are located and configured to engage energy absorption brackets, which are not illustrated. Energy absorption brackets are generally U-shaped with convex portion arranged in a generally forward direction in the vehicle and a rearward substantially straight portion. The energy absorption brackets are fixed to other vehicle structures such as the instrument panel cross beam or other relatively rigid structure. The energy absorption brackets are intended to absorb energy during a crash event.

The bolster is configured to provide a steering column cut out. This is shown in FIG. 1 by the curve marked 40. The point 42 is intended to indicate the location of the axis of the steering column when the bolster 10 is installed to the instrument panel assembly. It will be noted that the bolster contact surfaces 30 and 32 are laterally on either side of the steering column axis 42. This is the usual location of the energy absorption brackets in most standard vehicles. This is arranged on the assumption that the driver's knees at the time of impact will be located laterally to either side of the steering column.

Because the energy absorption brackets have a relatively straight flat surface for contact by the bolster, advantageously the bolster transfer surface 30 is bounded by a pair of generally vertically extending rib structures 50 and 52. The bolster transfer surface 32 is bounded by a similar pair of generally vertically extending rib structures 54 and 56. With reference to FIG. 1, it will also be noted that the bolster 10 comprises generally horizontally extending rib structures 60. In the example illustrated, there are four such rib structures 60a, 60b, 60c and 60d.

The rib structures 50, 52, 54, 56 and 60 are formed in the blow-molded procedure by molding the forward wall and the aft wall so as to touch together, as shown in FIG. 2. In the blow molding process, a parison is extruded and mold portions are closed over the parison. A blowing gas is delivered to the interior of the parison and the parison is expanded against the walls of the mold cavity of the mold portions. The mold cavity may have projections, which are fixed or the mold portions may have one or several moving components. During the blow molding process, the parison may be manipulated by slides within the molds or other structures so as to bring the generally forward wall into contact with the generally aft wall as shown at FIG. 2. As shown in FIGS. 1 and 2, this will create generally longitudinally extending ribs.

As an alternative to what is shown in FIG. 2 where the ribs are longitudinally extending, the ribs could be formed by a series of cones, dimples or depressions. Other than providing longitudinally extending ribs, a series of such cones, dimples or depressions can provide the same structural strength as a longitudinally extending rib. The cones or depressions are most advantageously formed in the forward wall so that the forward wall is brought into contact with the aft wall, which remains relatively smoothly curved. This is for appearance purposes as the aft facing wall of the bolster 10 will provide a surface, which may be visible in the vehicle. The term rib structure is used in this disclosure and in the claims to describe all such structures, whether ribs, cones, dimples, depressions, etc. which provide strength and reinforcement to the blow molded structure by bringing the forward and aft walls into contact.

The generally vertically extending ribs 50 and 52 are spaced apart so that the generally straight section of a typical energy absorption bracket will be snuggly received therebetween. Generally vertically extending rib structures 54 and 56 are also similarly located. In this manner, the generally vertically extending ribs 50 and 52 and 54 and 56, serve to give lateral location of the bolster 10 relative to the energy absorbing brackets. This is advantageous so that as energy is transferred from the bolster 10 to the energy absorption brackets, the bolster does not move laterally with respect to the brackets thereby helping to ensure that the bolster transfer surfaces 30 and 32 remain in direct contact with the energy absorption brackets.

The generally horizontally extending ribs 60 extend laterally across the bolster. The ribs 60 extend from adjacent a first bolster transfer surface 30 to adjacent the second bolster transfer surface 32. Advantageously, as shown in FIG. 1, the rib structures 60 can extend laterally into the bolster transfer surfaces 30 and 32 and can extend laterally on the other side of each of the bolster transfer surfaces 30 and 32.

Although the standard design standards assume that the 50 percentile adult, male driver will have knees located directly aft of the energy absorption brackets, the bolster 10 acts essentially as a horizontally oriented beam so that the knee impact can occur at other than directly aft of the energy absorption brackets and the bolster transfer surfaces 30 and 32. If one or both of the knees of the driver should contact the bolster between the bolster transfer surfaces, then the energy is transferred laterally to either side where the energy may be transferred by the bolster transfer surfaces and then to the energy absorption brackets. If one or other of the knees of the driver is located laterally outwardly from the bolster transfer surfaces, then the extended portion of the horizontally oriented rib structures 60 serve to transfer the force to the bolster transfer surfaces.

Advantageously, as shown in FIGS. 1 and 2, the bolster 10 includes a plurality of horizontally extending rib structures 60. By including a plurality of such horizontally extending rib structures, a bolster 10 can be provided with significant strength so that the bolster will not bend significantly about a generally vertical plane. Because of the strength incorporated into the bolster 10 by the generally horizontally extending rib structures 60, and because the bolster will therefore not bend significantly about a vertical plane, the bolster does not significantly change the shape or location of the curve 40 which is outside the design envelope of the steering column during a crash event. By incorporating the horizontally extending rib structures 60, the need for a separate steering column protector has been removed. Rather, the horizontal bending strength of the bolster is provided by the rib structures 60 of the blow molded structure.

The bolster 10 may be attached to surrounding instrument panel structure by typical trim molding clips 70 or by use of mounting flanges 72. Various other mounting systems may be used to locate the bolster in position.

The embodiment of the invention illustrated in the FIGS. 1 and 2 is a one-piece bolster which obviates the need for a separate steering column protector. The surface 20 of the aft wall 14 will be visible in the vehicle. Depending upon the nature of the vehicle, it may be sufficient for the surface 20 to be painted. Alternatively, the surface 20 may be coated with some sort of skin to provide the aft-most surface 14 to present a suitable appearance.

An alternate embodiment of the invention is illustrated in FIGS. 3, 4, 5 and 6. Similar numbers have been used to denote similar surfaces as there are several similarities between the two embodiments. The principal difference is that the bolster 110 illustrated in FIGS. 3, 4, 5 and 6 includes an additional component, an aft component 121. The bolster 110 includes a forward component 111 which is similar in most respects to the bolster 10. The aft component 121 has an aft component, aft surface 123 and an aft component, forward surface 125.

The aft component 121 presents its aft facing surface 123 to persons within the drivers compartment of the vehicle. Advantageously, the aft component 121 is an injection-molded component. Injection molding has suitable appearance characteristics and thus the surface 123, as the part emerges from the injection mold, may be suitable without further attention. However, the aft surface 123 may be painted, coated with skin or given other suitable surface treatment to meet appearance needs of the particular vehicle. The forward surface 125, on assembly with the forward component 111, lies so that the forward surface 125 of the aft component contacts the aft wall 114 of the forward component.

As shown in FIG. 5, the aft component 121 advantageously may be affixed to the forward component 111 by using one or more heat stakes 131. A heat stake is essentially a projection which extends outwardly from the injection-molded component 121 and through a suitable aperture formed in the forward component 111. Heat is then applied to the tip of the heat stake to form a head or thickening to provide suitable retention of the aft component 121 with the forward component 111. As shown in FIGS. 3 and 6, three such heat stakes are provided in the bolster 110.

In the embodiment shown in FIGS. 1 and 2, the bolster 10 has sufficient lateral length and vertical height, that it serves the desired appearance function and closes the appearance envelope within the vehicle.

In the embodiment illustrated in FIGS. 3, 4, 5 and 6, the forward component 111 provides the strength requirements as discussed in connection with bolster 10 but is not required to extend vertically downwardly to adjacent the steering column envelope. Thus in the embodiment illustrated in FIGS. 3, 4 and 5, the perimeter 141 which surrounds the steering column envelope is part of the aft component 121 rather than being part of the forward component 111. However, as with the embodiment of FIGS. 1 and 2, the location and shape of the edge 141 will not substantially change during a crash involving contact of the driver's knee with the bolster 110. Sufficient strength is provided by the forward component 111 to prevent any substantial deflection of the aft component 121.

In effect, the blow molded portion of the bolster 110 provides the structural strength in both the horizontal and vertical sense. The horizontally extending rib structure or structures act to transfer forces from the point or points of impact to the bolster transfer surfaces. The vertically extending structures also serve the function of transferring loads which may be vertically below or above the bolster transfer surfaces. The generally vertically extending rib structures thus also help to distribute the impact loads so that the plurality of horizontally extending rib structures all share in transferring the loads to the bolster transfer surfaces. While in the preferred embodiment illustrated herein, the rib structures extend substantially horizontally and substantially vertically, it will be recognized that the exact orientation of the rib structures is simply a matter of choice. Particularly when using depressions, dimples or cone-like holes, the array of strengthening rib structures incorporated into the bolster may be arranged in various directions to provide the necessary horizontal and vertical load transmission paths discussed herein.

Figure 7:
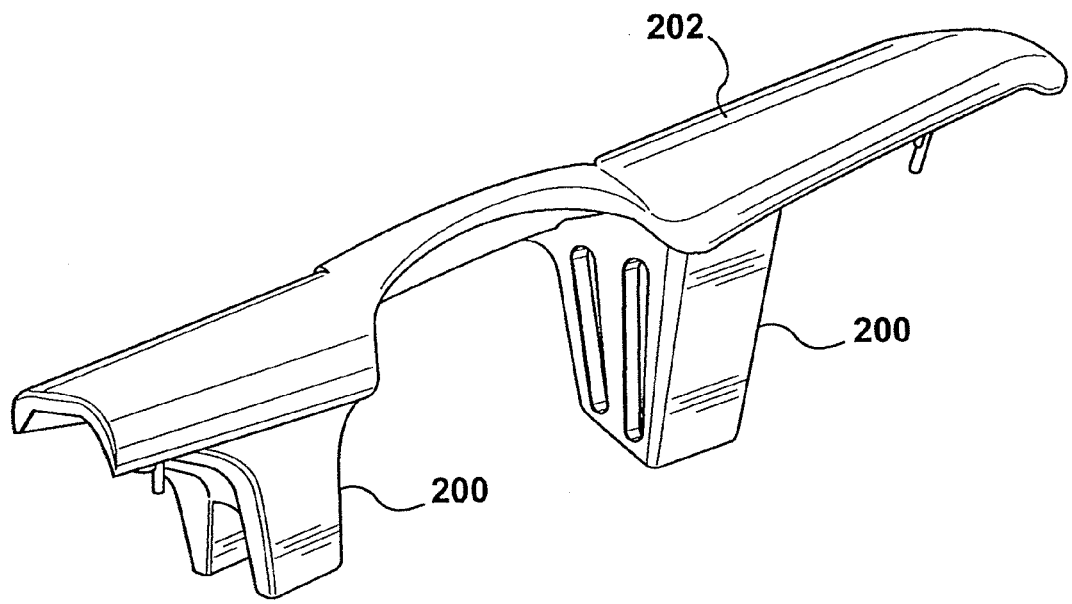
FIG. 7 is a perspective view of another alternate embodiment of the invention.

In the preferred embodiment described herein, the bolster 110 may be used in an existing instrument panel design which incorporates the typical energy absorption brackets. However, as shown in FIG. 7, utilizing the concepts of the present invention, energy absorption brackets, shown at 200, may be incorporated into a bolster, which is shown at 202. In such a case, the bolster transfer surface will become part of the energy absorption bracket 200. With this type of system, a subassembly including the bolster 202 with integral energy absorption brackets 200 may be utilized. This can then be attached to the vehicle structural components such as the instrument panel cross beam (not shown).

As a further alternate embodiment to that which is shown in FIG. 7, the energy absorbing brackets may be partially integrated into the bolster, instead of being fully integrated. For example, the energy absorbing brackets may be generally C-shaped and the bolster may contain structure sufficient to complement the C-shaped brackets so as to provide similar function to the bolsters and brackets shown and described above.

In discussing these embodiments of the invention, the concept is that forces are applied to the most aft surface of the bolster. In the example of bolster 10, that will be the aft wall of the blow molded component. In the case of the embodiment for the bolster 110, the forces are directed first to the aft component 121. It is also possible however, particularly with the blow molded bolster 10 and the forward component 111, to incorporate energy absorbing structures within the blow molded component itself. It may be done by including a number of dimples extending between the aft wall and the forward wall of the blow molded component. Those dimples may be designed to help dissipate the energy of impact so that at least a portion of the impact energy is dissipated by collapse of the aft wall of the blow molded component toward the forward wall of the blow molded component. Energy reaching the forward wall can then be transferred to the bolster transfer surfaces for further energy absorption in the energy absorption brackets.

While the above description constitutes the description of the preferred embodiments, it will be appreciated that the present invention is susceptible to modification and change without departing from the fair meaning of the accompanying claims.

The invention claimed is:

1. A bolster for assembly to an instrument panel assembly of an automotive vehicle, said vehicle having a steering column with a steering column axis and at least two energy absorbing brackets located laterally to either side of said steering column axis, said bolster comprising a single piece unitary structure having a generally forward wall and a generally aft wall, said forward wall having a forward wall, forward surface said forward wall, forward surface including first and second bolster transfer surfaces for transferring forces from said bolster to said energy absorbing brackets, said bolster further comprising a plurality of generally laterally extending rib structures, said rib structures extending from adjacent said first bolster transfer surface to adjacent said second bolster transfer surface, said plurality of generally laterally extending rib structures having sufficient strength to inhibit bending of said bolster about a vertical plane when struck by a driver's knees, at a point or points which are not directly aft of said bolster transfer surfaces.

2. The bolster of claim 1 wherein said bolster is blow molded.

3. The bolster of claim 2 wherein said bolster includes sufficient rib structures so that said bolster will not bend under said force so as to intrude into the vehicle space envelope reserved for said steering column.

4. The bolster of claim 3 wherein said rib structure of said bolster incorporates a steering column protector.

5. The bolster of claim 3 wherein said sufficient number of rib structures provides sufficient bending strength about a vertical plane that said bolster does not require a separate steering column protector.

6. The bolster of claim 4 wherein said rib structures extend laterally of said bolster laterally beyond at least one of said bolster transfer surfaces.

7. The bolster of claim 4 wherein said bolster includes at least one generally vertically extending rib structure adjacent said first transfer surface to provide lateral support for said bolster relative to said first transfer surface.

8. The bolster of claim 7 wherein said bolster includes a plurality of said generally vertically extending rib structures for laterally supporting said bolster to inhibit lateral movement of said bolster relative to said energy absorbing brackets when installed.

9. The bolster of claim 1 wherein said bolster includes integral energy absorbing brackets.

10. The bolster of claim 9 wherein said energy absorbing brackets include said transfer surfaces.

11. The bolster of claim 1 wherein said bolster includes energy absorption dimples located between said forward wall and said aft wall for absorbing energy from forces applied to said aft wall.

* * * * *